Dec. 6, 1960 E. A. LINK ET AL 2,963,543

UNDERWATER TELEVISION PROPULSION APPARATUS

Filed Dec. 10, 1956 10 Sheets-Sheet 1

EDWIN A. LINK
GUNNE LOWKRANTZ
KARL A. KAIL
INVENTORS

BY Darby & Darby
ATTORNEY

Dec. 6, 1960 E. A. LINK ET AL 2,963,543

UNDERWATER TELEVISION PROPULSION APPARATUS

Filed Dec. 10, 1956 10 Sheets-Sheet 2

STARBOARD SIDE VIEW

TOP VIEW

PORT SIDE VIEW

BOTTOM VIEW

EDWIN A. LINK
GUNNE LOWKRANTZ
KARL A. KAIL
INVENTORS

BY Darley + Darby
ATTORNEYS

Dec. 6, 1960 E. A. LINK ET AL 2,963,543

UNDERWATER TELEVISION PROPULSION APPARATUS

Filed Dec. 10, 1956 10 Sheets-Sheet 3

EDWIN A. LINK
GUNNE LOWKRANTZ
KARL A. KAIL
INVENTORS

BY Darby + Darby
ATTORNEYS

Dec. 6, 1960 E. A. LINK ET AL 2,963,543

UNDERWATER TELEVISION PROPULSION APPARATUS

Filed Dec. 10, 1956 10 Sheets-Sheet 4

EDWIN A. LINK
GUNNE LOWKRANTZ
KARL A. KAIL
INVENTORS

BY Darby + Darby
ATTORNEYS

UNDERWATER TELEVISION PROPULSION APPARATUS

Filed Dec. 10, 1956 10 Sheets-Sheet 5

EDWIN A. LINK
GUNNE LOWKRANTZ
KARL A. KAIL
INVENTOR

BY Darby + Darby
ATTORNEYS

UNDERWATER TELEVISION PROPULSION APPARATUS

Filed Dec. 10, 1956 10 Sheets-Sheet 6

EDWIN A. LINK
GUNNE LOWKRANTZ
KARL A. KAIL
INVENTORS

BY Darby + Darby
ATTORNEYS

EDWIN A. LINK
GUNNE LOWKRANTZ
KARL A. KAIL
INVENTORS

BY Darby + Darby
ATTORNEYS

EDWIN A. LINK
GUNNE LOWKRANTZ
KARL A. KAIL
INVENTORS

BY Darley + Darley
ATTORNEYS

EDWIN A. LINK
GUNNE LOWKRANTZ
KARL A. KAIL
INVENTORS

BY Darby & Darby
ATTORNEY

EDWIN A. LINK
GUNNE LOWKRANTZ
KARL A. KAIL
INVENTORS

BY Darby & Darby
ATTORNEY

United States Patent Office 2,963,543

Patented Dec. 6, 1960

2,963,543

UNDERWATER TELEVISION PROPULSION APPARATUS

Edwin A. Link and Gunne Lowkrantz, Binghamton, N.Y., and Karl A. Kail, Montrose, Pa., assignors to General Precision Inc., a corporation of Delaware Filed Dec. 10, 1956, Ser. No. 627,464

6 Claims. (Cl. 178—6.8)

This invention relates to an under water housing for a television link and more particularly to the propulsion and control of a hermetically-sealed housing which carries image transmitting apparatus such that under water scenes may be observed at various depths, angles and distances from a control station and operator located on ship board or other remote points.

For many years it has been the practice of humans to observe the underwater scene by means ranging from shallow water breathing apparatus to the use of pressurized deep water diving equipment. The objectives were many. To some it was to observe the sea life and vegetation. To others it was a means of searching for relics such as sunken ships for the purpose of obtaining treasure troves, salvage rights and for less mercenary historic and aesthetic reasons. To still others an investigation of the sea bottom is of importance for navigation and oceanographical reasons.

In addition to human beings descending into the depths of the ocean, it has long been known to lower structures into the sea containing an underwater camera. These structures are constructed in a manner such as to provide lighting and withstand the water pressure of great depths. These structures, however, have several disadvantages in their lack of maneuverability and in many cases they are without any propulsion system whatsoever. Another disadvantage was the lack of an immediate presentation of the image viewed by the camera. With the development of the newer communication techniques such as television and facsimile broadcasting, the possibilities of underwater exploration were greatly enlarged. For example, housings capable of being submersed were conceived for the purpose of propelling a movable support for a television camera around underwater. These propulsion means were powered and controlled from a remote point through a flexible control cable. The propulsion unit consisted of a propeller driven by a reversible electric motor, and the directional control consisted of horizontal and vertical rudders. While these developments of the art represented an advance over previous technology it provided markedly limited maneuverability and flexibility of control for the attitude, heading and depth of the housing in which television camera was mounting. The reason for this is fundamental and is based on the fact that in order for the rudder to be effective the housing has to be moving forward or backward. Thus by using the propulsion and control systems of the prior art it is impossible to change the depth, attitude or heading of the housing without changing its geographical position. As is obvious these are degrees of freedom which are particularly important in properly orienting a television camera. Another shortcoming of the prior art results from the effect of drift or water currents on both the housing and cable connecting it to the control station. Using the propulsion and control system of the prior art the rudders can compensate for the effects of water currents only when the housing is changing its geographical position.

It is, therefore, a primary object of the present invention to provide a hermetically sealed submersible housing for mounting image-transmitting apparatus which has improved and more flexible propulsion and control means.

It is another object of the present invention to provide improved propulsion and control means for a submersible housing such that its heading may be changed without modifying its geographical position, attitude and depth.

It is a further object of the present invention to provide improved propulsion and control means for a submersible housing such that its attitude may be changed without modifying its geographical position, heading and depth.

It is still another object of the present invention to provide an improved propulsion and control means for a submersible housing such that its depth may be changed without modifying its geographical position, heading and attitude.

It is another object of the present invention to provide an improved propulsion and control means for a submersible housing which may be moved laterally in geographical position without modifying its depth, heading and attitude.

Other objects of the invention will in part be obvious and will in part appear hereinafter.

The invention accordingly comprises the features of construction, combination of elements, and arrangement of parts, which will be exemplified in the construction hereinafter set forth, and the scope of the invention will be indicated in the claims.

For a fuller understanding of the nature and objects of the invention reference should be had to the following detailed description taken in connection with the accompanying drawings, in which:

Fig. 1 is a perspective view, partially in section, of the housing of this invention;

Figs. 2A, B, C, D, E and F are several views of the housing of Fig. 1 illustrating the disposition of the propulsion nozzles in accordance with the present invention when seen from the bow, stern, top, bottom, starboard and portside respectively.

Fig. 3 is a flow chart illustrating the flow of the propelling fluid through the controlling valves and nozzles of the housing of Fig. 1;

Figs. 4A and 4B taken together are wiring diagrams of the electrical control circuits for the housing of Fig. 1;

Fig. 5A is a view of the housing of Fig. 1 in a nose down attitude;

Fig. 5B provides an illustration electrical circuitry helpful in describing the operation of the propulsion means and their controls for nosing down the housing of Fig. 1;

Fig. 6 provides an illustration of the operation of the ballast units and their control circuits for one maneuver of the housing of Fig. 1;

Figure 1:
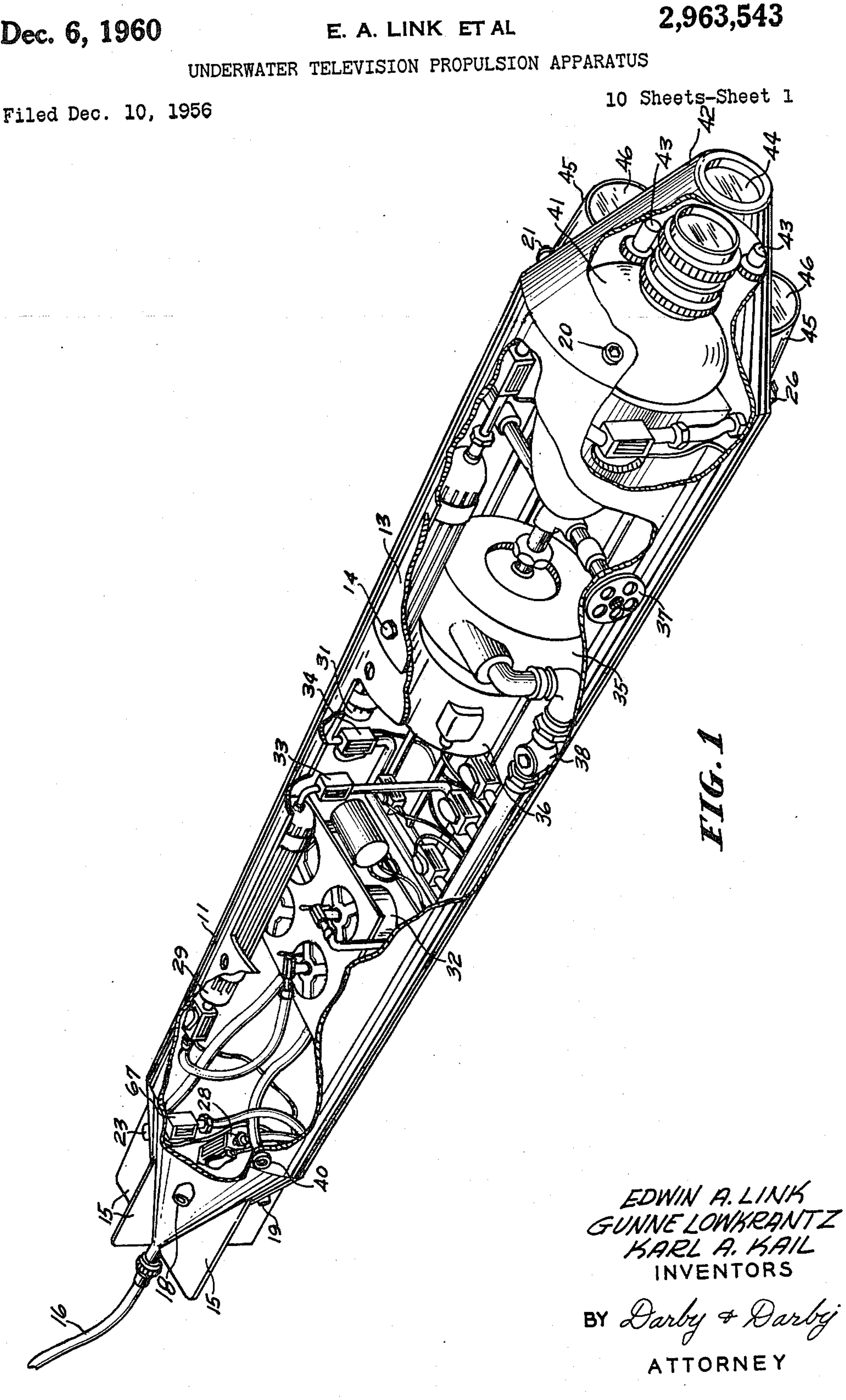

Referring now to the drawings, and to Fig. 1 in particular, the reference character 11 designates a generally torpedo-shaped housing having large openings 12 not shown in Fig. 1 in the top thereof. However, the housing 11 may be made of any strong material. Plastic has been used satisfactorily thereby reducing the weight of the housing considerably. The openings 12 are closed by readily removable and replaceable hatch covers 13 which are removably secured to the housing 11 by bolts 14 to provide ready access to the interior of the housing and to the equipment contained therein. At the stern of the housing 11 there are situated, at 90° intervals and projecting perpendicularly from the surface thereof, four vanes 15 which serve to stabilize the housing while it is in motion. Trailing behind the housing 11 as illustrated in Fig. 1 is a cable 16 by which communication may be maintained between the housing and other devices or persons. Nozzles, or jets, 23, 18, 40, 20, 21, 19 and 26 are shown projecting slightly from the surface of the housing 11, jets 17, 18, 40 and 19 being located at the stern and jets 20, 21 and 26 at the bow. In addition to those nozzles which are visible in Fig. 1, there are also on the surface of the housing jet 22 diametrically opposite jet 18, jet 23 diametrically opposite jet 19, and jet 25 diametrically opposite jet 20, their locations being made clearer in Fig. 2.

The housing 11 contains operating equipment such as a solenoid-operated valve 67 which controls the flow of fluid to the nozzle 23, valve 28 which controls the flow to jet 18, ballast tanks 29 and 31, and the compressed air containers 32 for forcing ballast out of the banks 29 and 31. It should be emphasized that the storage capacity for compressed air is limited and it is often desirable to store a condensible gas (as a liquid under pressure) such as Freon in containers 32 instead of air in order that the capacity satisfy the operational need for forcing ballast out of tanks 29 and 31. The use of Freon for this purpose is exemplary only as there are several others which liquify at reasonable pressures and may be used for the same purpose. A water pump 35 is powered by an electric motor 36 and is supplied with water through screened ports 37 in the sides of the housing 11. In addition to the screening on the ports 37 which serve to keep large objects from entering the water system of the housing, a filter 38 is also provided to ensure that no foreign particles are circulated through the system to cause malfunctioning of the equipment.

In addition to the propulsion and control equipment, the housing 11 contains in its forward portion television or camera equipment generally designated by the reference character 41 and having lenses 42 which are adjustable by means of synchro receiver 43. A glass faced port 44 in the nose of the housing 11 permits the images of objects outside the housing to impinge upon the sensitized surfaces of the television or camera devices 41 through the lenses 42. Projecting from the surface of the housing 11 and spaced evenly about its nose are four lamp housings 45 containing lenses 46 for illuminating the scene before the lens system 42. These lamp housings may be made detachable in order that they need not be carried when there is no need for illumination.

Although some of the items contained within the housing 11 have been pointed out above, no attempt has been made carefully to explain or identify in detail all of the equipment contained therein. The arrangement of the machinery disclosed herein is illustrative only. In this connection, it should be understood that the cable 16 is not necessary to the practicing of the present invention since it is well within the ability of those skilled in the art to provide the housing 11 with a self-contained energy supply and radio and sonar equipment for both control and communication purposes.

Figure 2A:
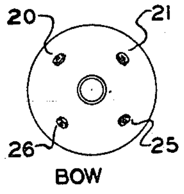
Figure 2B:
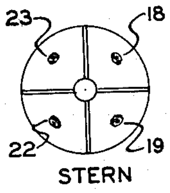
Figures 2C, 2D, 2E, 2F:
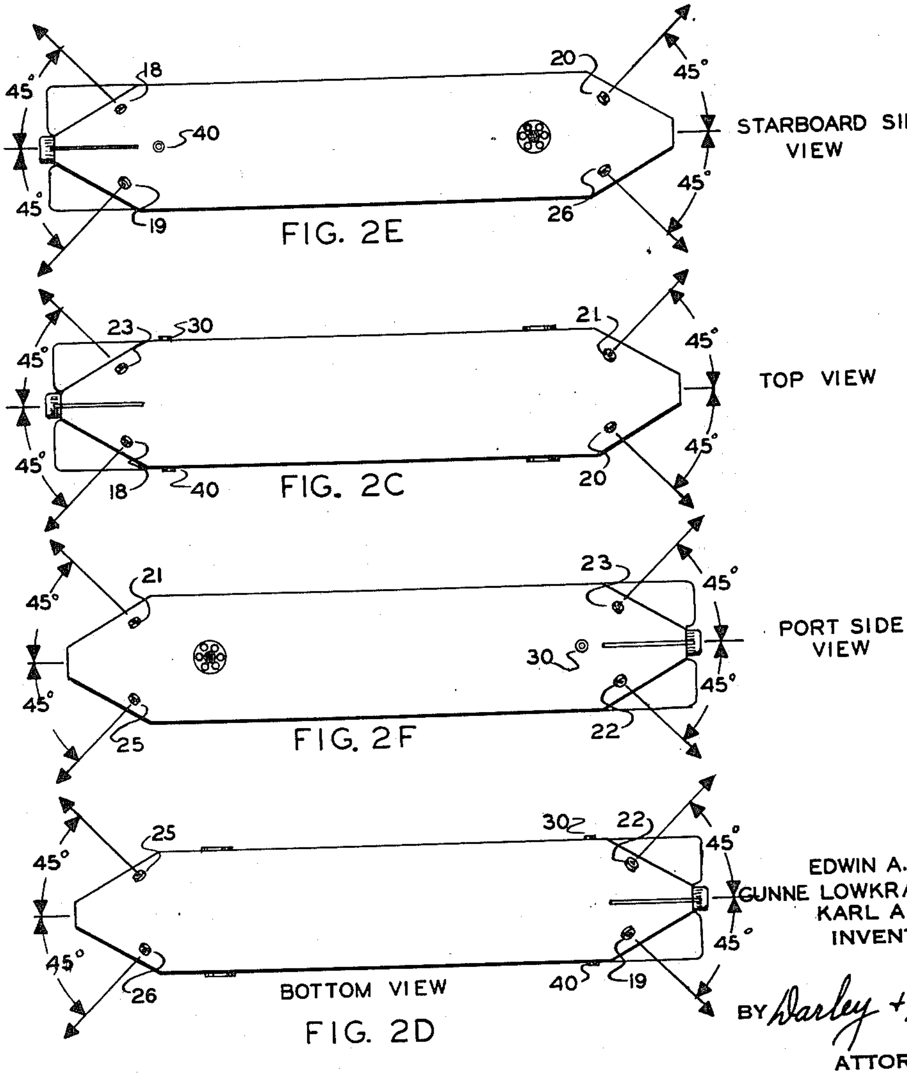

Fig. 2 illustrates diagrammatically in several views the novel disposition of identical nozzles or jets by means of which the housing is maneuvered in accordance with the present invention. As illustrated in Fig. 2A jets 20, 21, 25 and 26 are located at the bow, while Fig. 2B shows jets 18, 19, 22 and 23 located at the stern. As will be clear from the orientation of these jets in Figs. 2C, 2D, 2E and 2F each makes an angle of approximately 45 degrees with the longitudinal axis of the housing, thereby providing each jet stream with a reaction component of force which is parallel and one which is perpendicular to the longitudinal axis. Thus, if the identical jets 18, 20, 21 and 23 shown in top views Fig. 2C, are opened simultaneously the "parallel" components of reactive force of jets 18 and 23 are equal and opposite to the "parallel" components of the reactive forces of jets 20 and 21. However, the "perpendicular" components of reactive force of each of these jets have a resultant force commensurate with their sum which forces the housing down to a greater depth while the attitude and heading of the housing is maintained. Also, if the identical jets 19, 22, 25 and 26 shown in Fig. 2D are opened simultaneously the "parallel" components of reactive force of jets 19 and 22 are equal and opposite to the "parallel" components of the reactive forces of jets 25 and 26, while the "perpendicular" components of reactive force of each of these jets have a resultant force commensurate with their sum which forces the housing up toward the surface with the attitude and heading of the housing being maintained. Further, if the identical jets 18, 19, 20 and 26 shown in Fig. 2E are opened simultaneously the "parallel" components of reactive force of jets 18 and 19 are equal and opposite to the "parallel" components of the reactive forces of jets 25 and 26. However, the "perpendicular" components of each of these jets have a resultant force commensurate with their sum, which forces the housing to move laterally to port with the heading and attitude of the housing being maintained. Moreover, if the identical jets 21, 25, 23 and 22 shown in Fig. 2F are opened simultaneously the "parallel" components of the reactive forces of jets 21 and 25 are equal and opposite to the reactive forces of jets 22 and 23. While the "perpendicular" components of each of these jets have a resultant force commensurate with their sum which forces the housing to move laterally to starboard with the heading and attitude of the housing 11 being maintained. Thus by the novel orientation of these identical jets the housing 11 can be moved laterally to port or starboard or up and down without using vanes, elevators or other control surfaces which would require the housing to have forward motion before such control is effective.

In addition, if the jets 18, 19, 22 and 23 shown in Fig. 2B are opened simultaneously the "parallel" components of the reactive forces of all of these jets are additive and serve to give the housing 11 a forward motion commensurate with their sum, while the "perpendicular" components of reactive forces of these jets cancel each other out, thereby eliminating any propulsion forces which would cause the attitude and heading of the housing to change. Further, if the jets 20, 21, 25 and 26 shown in Fig. 2A are opened simultaneously the "parallel" components of the reactive forces of all of these jets are additive and serve to give the housing 11 a backward or astern motion commensurate with their sum, while the "perpendicular" components of the reactive forces of these jets cancel each other out thereby eliminating any propulsion forces which would cause the attitude and heading of the housing to change.

Other combinations of the operation of these eight jets may be used to change the attitude of the housing 11. For example, if jets 20 and 21 on the bow and jets 19 and 22 on the stern are opened simultaneously the "parallel" components of the reactive forces of jets 20 and 21 are equal and opposite to the "parallel" components of the reactive forces of jets 19 and 22, while the resultant "perpendicular" component of the reactive forces of jets 19 and 22 forms a couple with the resultant "perpendicular" component of the reactive forces of jets 20 and 21 to cause the bow to go down or pitch about the center of buoyancy of the housing 11. Likewise, if jets 25 and 26 on the bow and jets 18 and 23 on the stern are opened simultaneously the "parallel" components of the reactive forces of jets 25 and 26 are equal and opposite to the "parallel" components of the reactive forces of jets 18 and 23, while the resultant "perpendicular" component of the reactive forces of jets 25 and 26 are equal and opposite to the "parallel" components of the reactive forces of jets 18 and 23, while the resultant "perpendicular" component of the reactive forces of jets 25 and 26 forms a couple with the resultant "perpendicular" component of the reactive forces of jets 18 and 23 to cause the bow to rise or pitch about the center of buoyancy of the housing 11. It should be noted that housing 11 maintains its heading and position during these changes of attitude. Still other combinations of the operation of these eight jets may be used to change the heading of the housing 11. For example, if jets 21 and 25 on the port side of the bow and jets 18 and 19 on the starboard side of the stern are opened simultaneously the "parallel" components of the reactive forces of jets 21 and 25 are equal and opposite to the "parallel" components of the reactive forces of jets 18 and 19, while the resultant "perpendicular" component of the reactive forces or jets 18 and 19 to cause the bow to swing to starboard while the attitude and position of the housing 11 is maintained the same. Likewise, if jets 20 and 26 on the starboard side of the bow and jets 22 and 23 on the port side of the stern are opened simultaneously the "parallel" components of the reactive forces of jets 20 and 26 are equal and opposite to the "parallel" components of the reactive forces of jets 22 and 23, while the resultant "perpendicular" component of the reactive forces of jets 20 and 26 forms a couple with the resultant "perpendicular" component of reactive forces of jets 22 and 23 to cause the bow to swing to port, while the attitude and position of the housing is maintained the same.

In summary, proper manipulation or opening of particular combinations of these eight identical nozzles or jets 20, 21, 25, 26, 18, 19, 22 and 23 allowing housing 11 to (1) descend (increase its depth) or rise (move closer to the surface) while maintaining its attitude and heading; (2) move laterally to the right (starboard) or move laterally to the left (port) while maintaining its attitude and heading; (3) move forward while maintaining its heading and attitude; (4) move backward (astern) while maintaining its heading and attitude; (5) pitch its bow down or pitch its bow up while maintaining its heading and position; and (6) turn its bow to the right (starboard) or turn its bow to the left (port) while maintaining its position and attitude.

In addition to eight identical jets already discussed which are positioned and controlled to provide greatly increased maneuverability over that provided by propulsion means of the prior art, two additional jets or nozzles 30 and 40 are located on the port and starboard sides respectively of housing 11 for the purpose of providing drift correction by an amount which varies with the particular environment of the use of the propulsion means of the present invention. One of the reasons that the housing and propulsion means of the present invention is particularly sensitive to the amount of ocean current running is that in addition to acting on the housing itself, it also acts on the control cable 16 which may have sufficient length and cross-section such that the resultant force is substantial. As will be discussed hereinafter, depending on the direction and force involved either jets 30 or 40 are opened by an amount in order that the effect of the ocean current is opposed.

Figure 3:
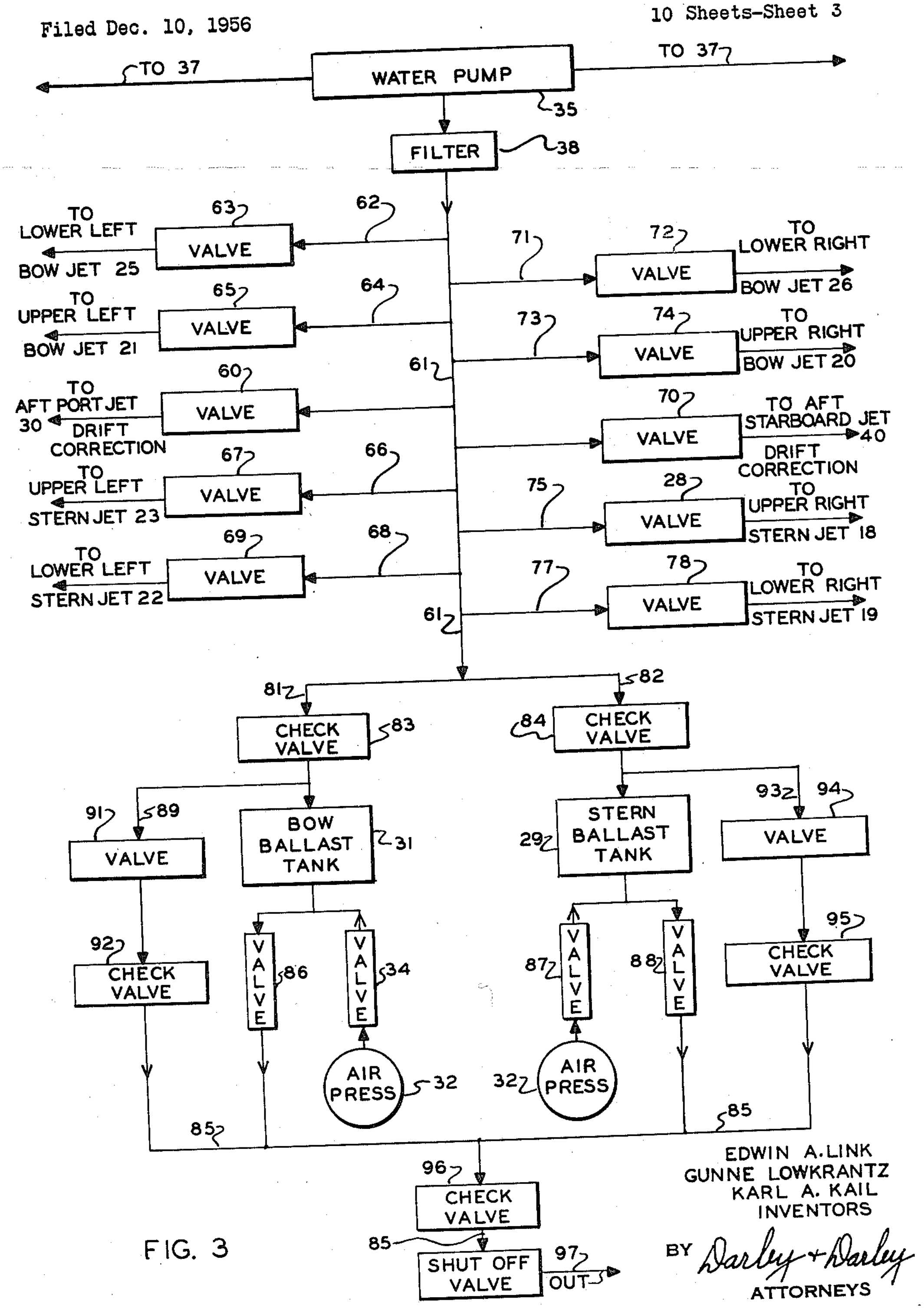

Fig. 3 illustrates the flow of the driving fluid through the system and the arrangement of the fluid controls for governing the motion of the housing 11. The water pump 35 which receives its fluid, in this case water, from the medium in which the housing 11 is moving, supplies the water to a water main 61. Branching off from the main 61 in parallel are water lines to the individual nozzles. A line 62 contains a solenoid-operated valve 63 and supplies water to the lower left bow nozzle 25. A line 64 is connected to the upper left bow jet 21 through a valve 65, and the upper left stern jet 23 is supplied through a valve 67 by line 66. Water to the lower left stern jet 22 is supplied through a valve 69 by a line 68 and to the lower right bow nozzle 26 by a line 71 and valve 72. A line 73 containing a valve 74 is connected at one end to the main 61 and at the other end to the upper right bow jet 20, and the upper right stern jet 18 is fed through a valve 28 by a line 75. The lower right stern jet 19 is supplied with water from the main 61 by a line 77 which contains a valve 78. Port and starboard drift correction nozzles 30 and 40 are supplied from the main 61 through valves 60 and 70 respectively.

In addition to the lines supplying water from the pump 35 to the jets, the main 61 also supplies water to the ballast tanks 29 and 31. A line 81 connects the main 61 through a check valve 83 to the bow ballast tank 31, and a line 82, in parallel with the line 81 connects the main 61 through a check valve 84 to the stern ballast tank 29. An overflow line 89 is connected across the bow ballast tank 31 and contains a solenoid-operated valve 91 and a check valve 92. An overflow line 93 containing a solenoid-operated valve 94 and a check valve 95 is connected across the stern ballast tank 29. The two overflow lines 89 and 93 are connected together at one end to an exhaust line 85 and through a check valve 96 and a manually operated shutoff valve 97, to the exhaust from the housing 11. The exhaust line 85 is also connected to the bow ballast tank 31 through a valve 86 and to the stern ballast tank 29 through a valve 88. The containers of compressed air (or condensed gas) 32 are connected to the bow ballast tank 31 through a valve 34 and to the stern ballast tank 29 through a valve 87.

The pump 35 is continuously operating to supply all of the lines with water under pressure. Water can be expelled from a nozzle only when the valve associated with that nozzle is opened. The valves controlling the flow of both water and air are normally closed solenoid-operated valves and are controlled in a manner to be explained in connecton with Fig. 4. The check valves 83, 84, 92, 95 and 96 are not solenoid-operated but are self-contained units which serve to insure that the flow of water in the lines containing them is in but one direction. In normal operation, four nozzles are expelling water at one time. At the same time, the ballast tanks 29 and 31 may also be filling. It is the purpose of the pump 35 to maintain a flow of water in the main 61 sufficient for all purposes.

While the ballast tanks 29 and 31 may be used to maneuver the housing 11 their main function is to adjust the buoyancy of the housing to the specific gravity of the water in which the housing is to operate. By altering the amount of water in these two tanks the housing 11 may be given a zero, positive or negative buoyancy depending on the needs of the operation. Unequal ballast in tanks 29 and 31 will alter the fore and aft attitude of the housing 11.

To obtain the simultaneous operation of a plurality of jets, the valves in the water lines connecting the selected jets to the main 61 must be opened simultaneously. Water fed through the pump 35 is then allowed to enter the selected nozzle and to be expelled therefrom. Thus, the actual source of drive power for the housing 11 is the pump 35. The speed with which the housing 11 can move through the medium in which it is immersed depends upon the rate of discharge of fluid of the pump 35 through the nozzles. It should be noted, however, that in the disclosed embodiment the valves which control the rate of discharge from each nozzle are shown as an on-off type thereby allowing a particular nozzle to either provide a particular reaction force or none at all. As will be obvious, modification of the control circuits and valve controls for the provision of proportional control of the rate of discharge from the nozzles thereby allowing for selection of the speed with which the housing maneuvers is well within the teachings of the present invention. As a practical matter though, it is desirable that housing 11 be either substantially at rest at a particular attitude or manuevering comparatively slowly to a new position and attitude in the novel manner in accordance with the present invention.

For hovering and for slow changes in attitude or depth, the ballast tanks are ideal. By proper use of the control valves, the ballast tanks can be filled, or emptied, to the point where the housing has sufficient weight to just equal that of the water it displaces, and will hover. In order that optimum operation be obtained, it is necessary that the heading, attitude, and depth of housing 11 be known to the operator. As will be considered in more detail in connection with the description of the control console of Figs. 7A and 7B below, means for measuring each of these quantities may be located in the housing 11 and transmitted to the control console 301 (not shown) through control cable 16 by any of many well known telemetering techniques.

The ballast tank 31 is filled by opening the valve 86 and maintaining the valves 91 and 34 closed. Thus, water enters the tank 31, and overflows to the exhaust line 85 through the valve 86. If the valve 91 is also maintained open, then the flow of water is divided between the tank 31 and the line 89 and the flow to the tank 31 is greatly diminished. To empty (blow) the tank 31, the valve 86 is closed and the valves 91 and 34 are opened. This allows the compressed air (or condensed gas) from the containers 32 to enter the tank 31 and force the water contained therein out through the line 89 to the exhaust line 85. The check valves 83, 84, 92 and 95 are required for when the tanks 29 and 31 are blown, to prevent the highly compressed air (or condensed gas) of the containers 32 from forcing water back toward the pump 35. The check valve 96 is provided to prevent high pressure outside of the housing from forcing water against the action of the pump 35. The stern ballast tank 29 is filled and emptied in the same manner as is the tank 31.

It is entirely possible that the effects of the individual nozzles may not be identical, and that the housing 11 may drift slightly to port or to starboard during either forward or rearward motion. The drift correction nozzles 30 and 40 used to correct for the effects of ocean current may also be used to correct for this drift.

Figure 4A:
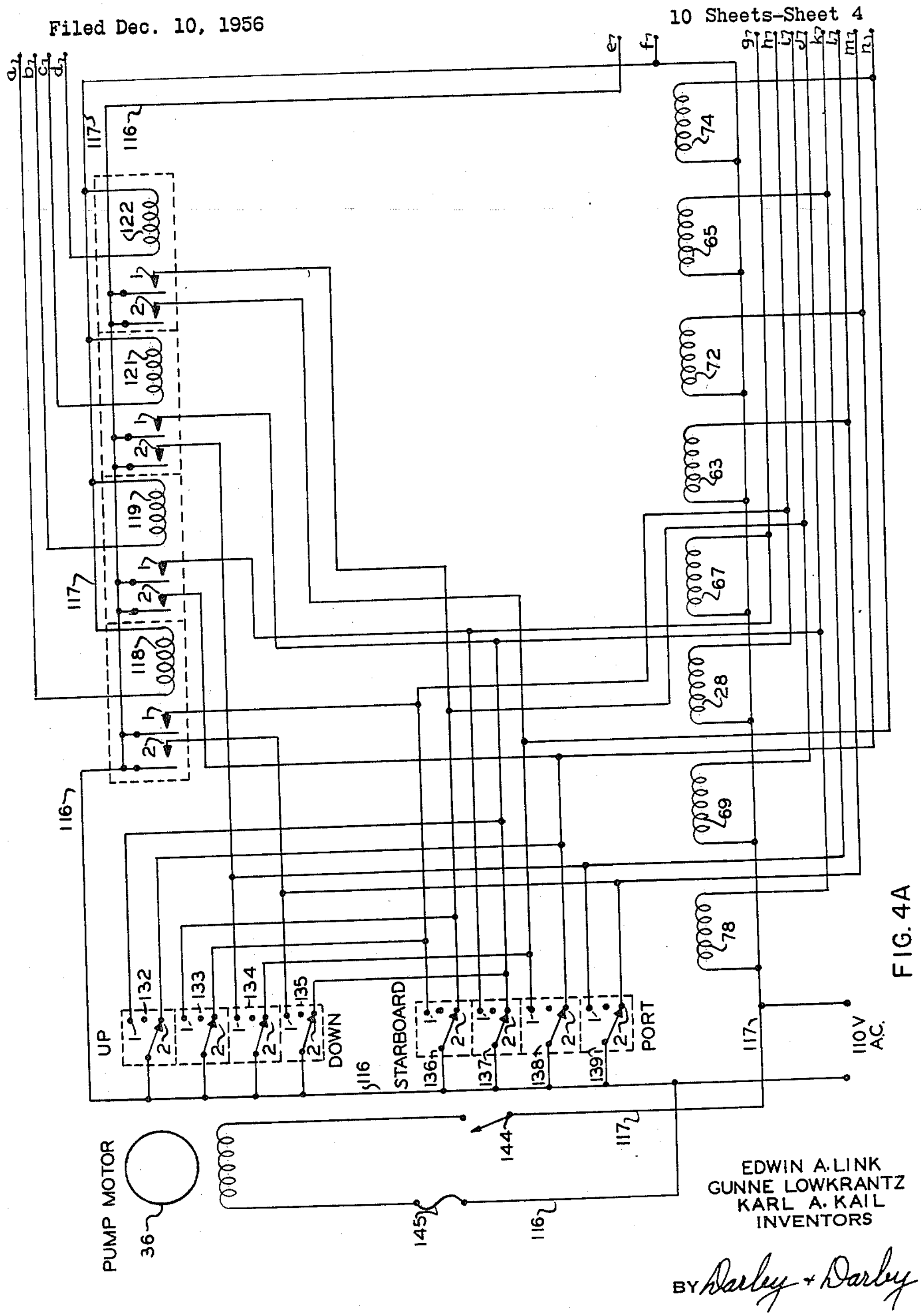
Figure 4B:
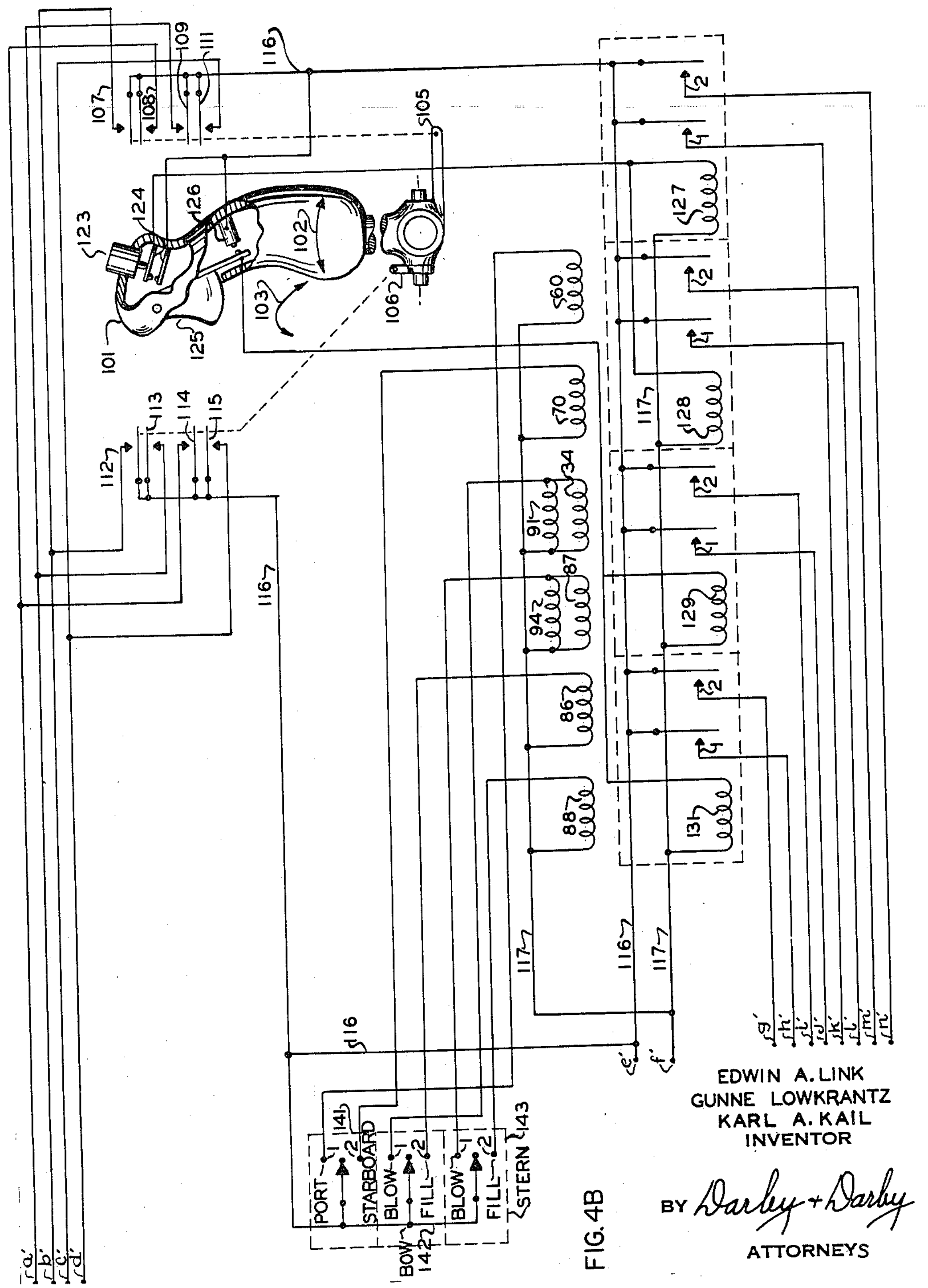

The means for controlling the operation of the valves is illustrated in Figs. 4A and 4B. It is contemplated that the operation of the housing 11 should be readily controlled by a single control stick and a few co-ordinated switches. The control stick 101 is shown as comprising a generally elongated body 101 having projections 105 and 106 perpendicular to the body 101 and to each other mounted thereon at its base. The body 101 is arranged to have two degrees of freedom as indicated by the vectors 102 and 103, Fig. 4B. The extremity of the projection 105 is attached, in any suitable manner, to the operating members of four ganged switches 107, 108, 109, and 111, and the extremity of the projection 106 is connected similarly to the operating members of ganged switches 112, 113, 114 and 115. The switches are each electrically connected to operate individual ones of four relays 118, 119, 121 and 122. Each relay comprises two sets of contacts 1 and 2 and each set of contacts is electrically connected to operate one of the eight solenoids which control the valves discussed above. Solenoids and valves are identified by the same reference characters for the sake of clarity. Energy is supplied through a pair of lines 116 and 117 which have terminals for connection to a suitable source of electrical power. The line 116 is connected to one side of each of the switches 107–109, 111, and 112–115 and to one side of each set of the relay contacts, while the line 117 is connected to one side of each of the relay coils and to one side of each of the valve solenoids. Thus, it can be seen, that if a switch is closed, a circuit is established from the line 116, through the closed switch to a relay coil and to the line 117, causing the relay to operate and completing two circuits from line 116, through the two sets of contacts 1 and 2 through two valve solenoids to the line 117.

The control lever 101 also comprises a push-button 123 which operates to close a spring-opened switch 124 whose function is described in the table set forth below and a trigger 125 which operates to close a spring-opened switch 126. The switch 124 is connected to a pair of relays 127 and 128 each comprising two sets of contacts 1 and 2, and the switch 126 is connected to another pair of relays 129 and 131, each of which also comprises two sets of contacts 1 and 2. The contacts of the relays 127, 128, 129 and 131 also control the energization of the valve solenoids. The line 116 is connected to a contact of each of the switches 124 and 126 and also to a contact of each of the sets of contacts of the relays 127–129 and 131, and the line 117 is connected to one side of each of the relay coils as well as to one side of each of the valve solenoids.

In addition to the above-described switches which are operated by the control lever 101, on a small control panel (not shown) are mounted 11 other switches which are operated in combinations to control the housing 11. Four single-pole triple-throw switches 132, 133, 134 and 135 are ganged to act together. The common (movable) contacts of the switches are connected together and to the line 116, and the stationary contacts are connected to individual valve solenoids. There are also four other single-pole, triple-throw switches 136, 137, 138 and 139 which have their common (movable) contacts connected together and to the line 116, and their other contacts to individual valve solenoids. The switches 132–135 in one position complete the circuits through those valve solenoids which will cause the housing to move up or down and the switches 136–139 are connected to those valve solenoids which act in concert to cause the housing to turn to the port or to the starboard.

A single-pole triple-throw switch 141, Fig. 4B, has its movable contact connected to line 116, one of its stationary contacts to the solenoids 60 for starboard drift correction and the other of its stationary contacts to the solenoid 70 for port drift correction. Another single-pole, triple-throw switch 142 has its movable contact connected to the line 116 and one of its stationary contacts connected to solenoids 91 and 34 in parallel for blowing the bow ballast tank while its other stationary contact is connected to the solenoid 86 to fill the bow tank 32. The stern ballast tank 29 is blown by operation of the solenoids 87 and 94 which are connected to one of the stationary contacts of a switch 143, and are filled by the operation of the solenoid 88 which is connected to another stationary contact of the switch 142, the movable contact of which is connected to the line 116. The other side of each of the valve solenoids 86, 87, 88, 91, 94 and 34 are connected together and the line 117.

The pump motor 36 is connected across lines 116 and 117 through a switch 144. In addition to the switch 144, the lines feeding the pump motor 136 also contain a fuse 145.

Because of the large number of lines, the large number of switches and the many combinations of lines and switches which are used for the various operations of the housing 11, it is considered impractical and unnecessary to trace each of the circuits of Fig. 4 through in detail. Instead, the following table is presented to indicate which of the switches of Fig. 4 is closed to operate each of the relays, and which set of relay contacts is operated to control the individual valve solenoid. Also indicated in the table is the maneuver of the housing 11 in which the individual elements and combinations thereof are used. It then becomes a simple matter to refer to the table for the maneuver desired, obtain the elements utilized in carrying out that meanuver, and then trace the entire operational circuit through on Figs. 4A and 4B.

| Maneuver | Switch | Relay | Solenoid | Nozzle |
|---|---|---|---|---|
| Nose up | 108 | 119-1 | 67 | 23 |
| | | 119-2 | 72 | 26 |
| | 111 | 118-1 | 28 | 18 |
| | | 118-2 | 63 | 25 |
| Nose down | 107 | 122-1 | 69 | 22 |
| | | 122-2 | 74 | 20 |
| | 109 | 121-1 | 78 | 19 |
| | | 121-2 | 65 | 21 |
| Turn-to-port | 113 | 121-1 | 78 | 19 |
| | | 121-2 | 65 | 21 |
| | 115 | 118-1 | 28 | 18 |
| | | 118-2 | 63 | 25 |
| Turn-to-starboard | 112 | 122-1 | 69 | 22 |
| | | 122-2 | 74 | 20 |
| | 114 | 119-1 | 67 | 23 |
| | | 119-2 | 72 | 26 |
| Forward | [1] 125 | 129-1 | 78 | 19 |
| | | 129-2 | 69 | 22 |
| | | 131-1 | 28 | 18 |
| | | 131-2 | 67 | 23 |
| Reverse | [2] 123 | 127-1 | 65 | 21 |
| | | 127-2 | 74 | 20 |
| | | 128-1 | 63 | 25 |
| | | 128-2 | 72 | 26 |
| Down (vertical) | 132-2 | -------- | 65 | 21 |
| | 133-2 | -------- | 74 | 20 |
| | 134-2 | -------- | 67 | 23 |
| | 135-2 | -------- | 28 | 18 |
| Up (vertical) | 132-1 | -------- | 63 | 25 |
| | 133-1 | -------- | 72 | 26 |
| | 134-1 | -------- | 67 | 23 |
| | 135-1 | -------- | 69 | 22 |
| Starboard (horizontal) | 136-2 | -------- | 63 | 25 |
| | 137-2 | -------- | 65 | 21 |
| | 138-2 | -------- | 67 | 23 |
| | 139-2 | -------- | 69 | 22 |
| Port (horizontal) | 136-1 | -------- | 78 | 19 |
| | 137-1 | -------- | 74 | 20 |
| | 138-1 | -------- | 28 | 18 |
| | 139-1 | -------- | 72 | 26 |
| Drift Correction: | | | | |
| Port | 141-1 | -------- | 60 | 30 |
| Starboard | 141-2 | -------- | 70 | 40 |
| Ballast tank: | | | | |
| Fill bow | 142-1 | -------- | 91, 34 | -------- |
| Fill stern | 143-1 | -------- | 87, 94 | -------- |
| Blow bow | 142-2 | -------- | 86 | -------- |
| Blow stern | 143-2 | -------- | 88 | -------- |

[1] Trigger.
[2] Push-button.

Figure 5A:
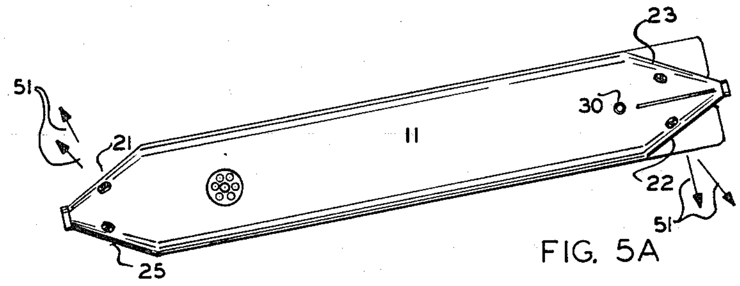
Figure 5B:
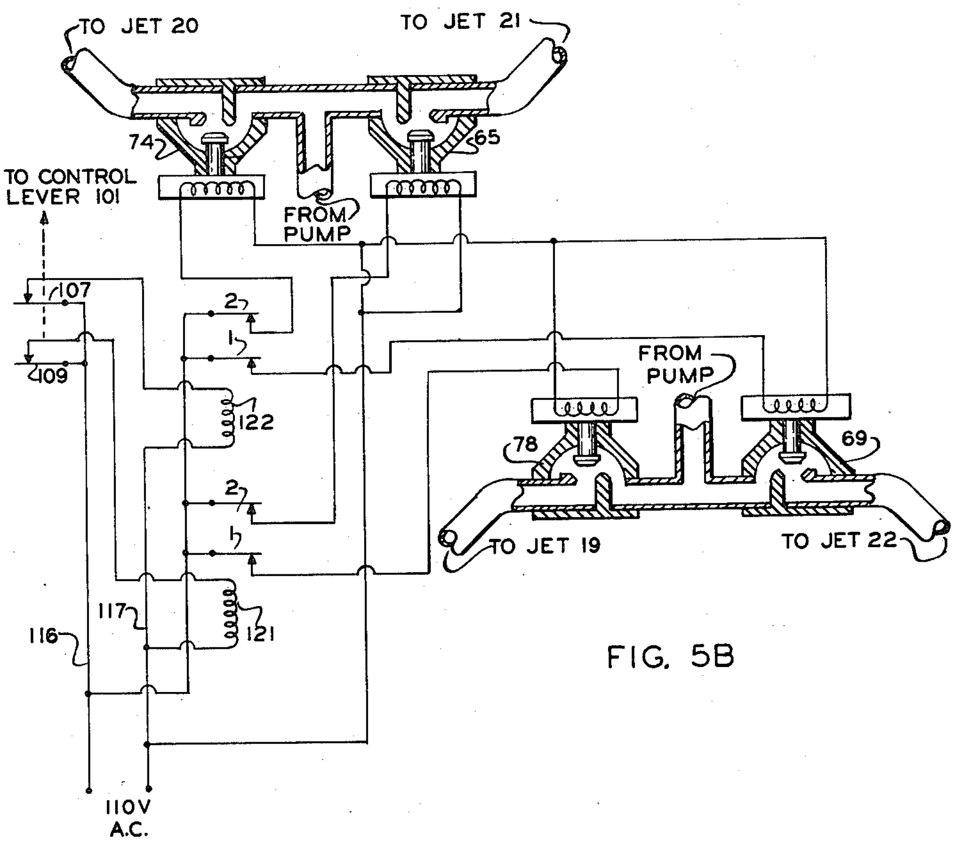

Further to explain the action of both the electrical and hydraulic controls, the housing 11 is illustrated being nosed down in Fig. 5A. Vectors 51 represent the streams of fluid being ejected from the active nozzles, 21 and 20 in the bow and 19 and 22 in the stern. Fig. 5B illustrates the manner in which the controls function to cause the housing 11 to perform this maneuver. An arrow is shown representing the connection of switches 107 and 109 with the control lever 101. The lever 101 has been pushed forward, moving the projection 105 upwardly and closing the switches 107 and 109. Energy from the 110 volt source passes through line 116, switch 107, through the coil of relay 122 and then to line 117. The contacts of the relay 122 are pulled closed, thereby establishing a complete circuit through the contact set 1, the solenoid of valve 69 and the lines 116 and 117, and through the contact set 2, the solenoid of valve 74 and the lines 116 and 117.

At the same time, the switch 109 completes the circuit through the coil of relay 121, closing its contacts and completing the circuits through the contact set 1 and solenoid of valve 78 and through contact set 2 and the solenoid of valve 65.

The valves 65, 69, 74 and 78, which are normally closed by the actions of their springs (not shown), are opened by their individual solenoids. Water from the pump 35 is forced through the open valves and is ejected through the upper bow nozzles 20 and 21 and through the lower stern nozzles 19 and 22 to cause the housing 11 to nose down and rotate counterclockwise as shown in Fig. 5A.

The action of the controls for the other maneuvers of the housing is identical, the difference being only in the circuits which are completed and the jets which are thus activated.

Figure 6:
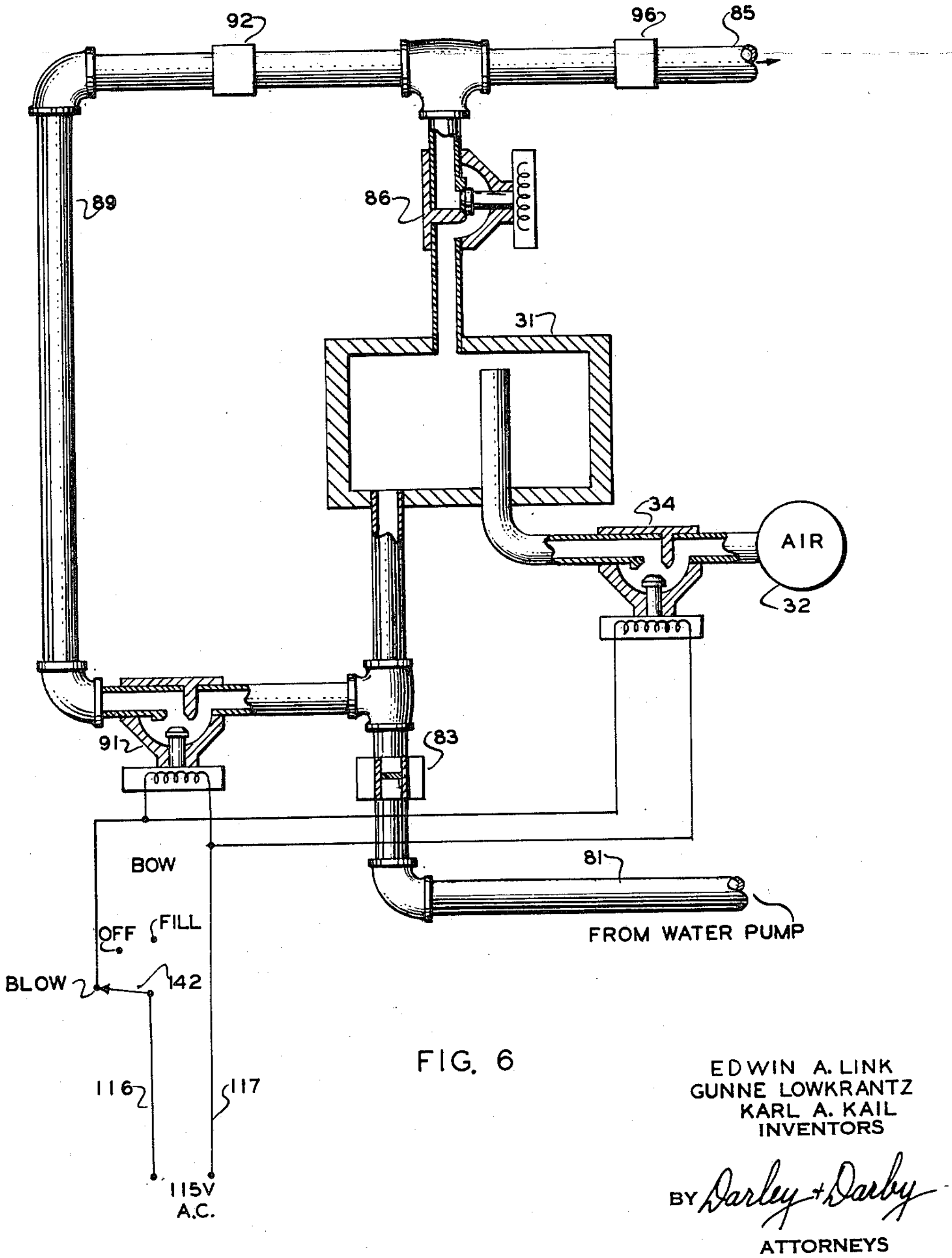

In Fig. 6 the action of the controls for blowing the bow ballast tank 31 has been illustrated. The switch 142 is set, manually, to the blow position, closing a circuit through its contact 1, the energy source, and the solenoids of valves 91 and 34. When valve 34 opens due to the energization of its solenoid, air from compressed air container 32 enters tank 31 and forces the water contained therein out through open valve 91. The expelled water passed through open valve 91, through the line 89 and the check valves 92 and 96 to the exhaust line 85 to be exhausted from housing 11.

Water is forced from tank 31 until the tank is empty or until switch 142 is operated. By proper operation of the switch 142, the water level in ballast tank 31 can be very delicately controlled so that the total weight of the housing 11 substantially balances the weight of the water it displaces. Absolute balance is virtually impossible, therefore, it is usually necessary periodically to adjust the amount of ballast in the tanks 29 and 31. Care must be taken so that the compressed air (or condensed gas) is not totally exhausted in this manner before the end of the desired run.

To fill tank 31 (this operation is not illustrated), the switch 142 is changed to correct its contact 2 into the circuit with the energy source. The contact 2 is connected to the valve 86 and this valve is thereby opened. When switch 142 is changed, valves 34 and 91 close, so that water from pump 35 is forced through line 81 into tank 31 and overflows through valve 86. Since valve 91 is closed, water cannot by-pass tank 31. Of course, it is understood that if finer control of the contents of tank 31 is desired, a valve may be inserted in line 81 to further control the amount of water entering tank 31. Without the additional valve in line 81, the level of the water in tank 31 is controlled by the opening and closing of valve 86. When valve 86 is open, water enters the tank freely, overflowing through the valve into exhaust line 85. But with valve 86 closed, water enters tank 31 only until the air trapped therein is compressed to the point where its pressure equals the pressure of the entering water. Thereafter, no more water will enter until the air pressure in the tank 31 is relieved.

Figure 7A:
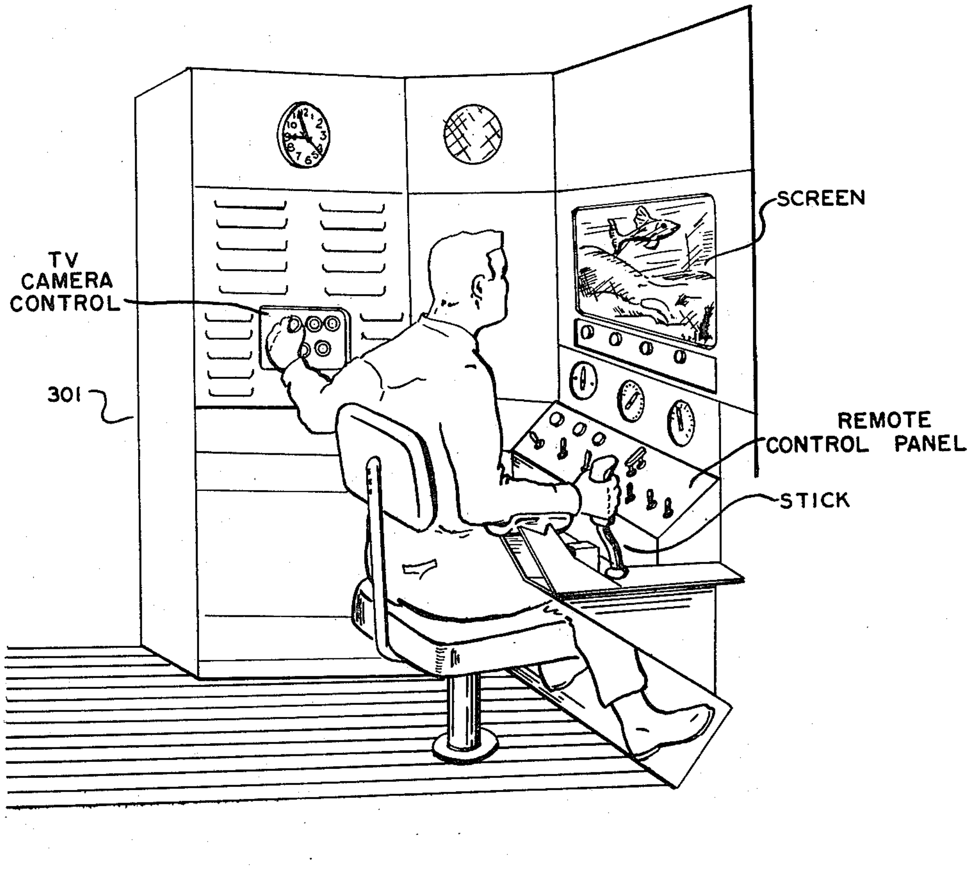
Fig. 7A is a pictorial view of the remote control console illustrating an exemplary arrangement of the television screen, television control panel, and propulsion control panel.

Figs. 1–6 described above set forth a novel propulsion means for housing 11 in which there may be mounted a television camera 41 the picture of which is to be transmitted to a receiver located at the control console generally designated by reference character 301 in Fig. 7A. Thus in addition to the propulsion controls already described and shown in greater detail in Fig. 7B, the control console located on ship board or other control station contains controls for tuning and adjusting both the television camera and the receiver. Exemplifying this is the adjustment of lens 42 in Fig. 1 by synchro receiver 43 connected through cable 16 to a similar synchro transmitter located at the control console. The number of adjustments which may be remotely located at the console is a matter of choice. The number and kind of adjustments required for the television receiver is also a matter of choice commensurate with well known closed circuit television techniques.

Figure 7B:
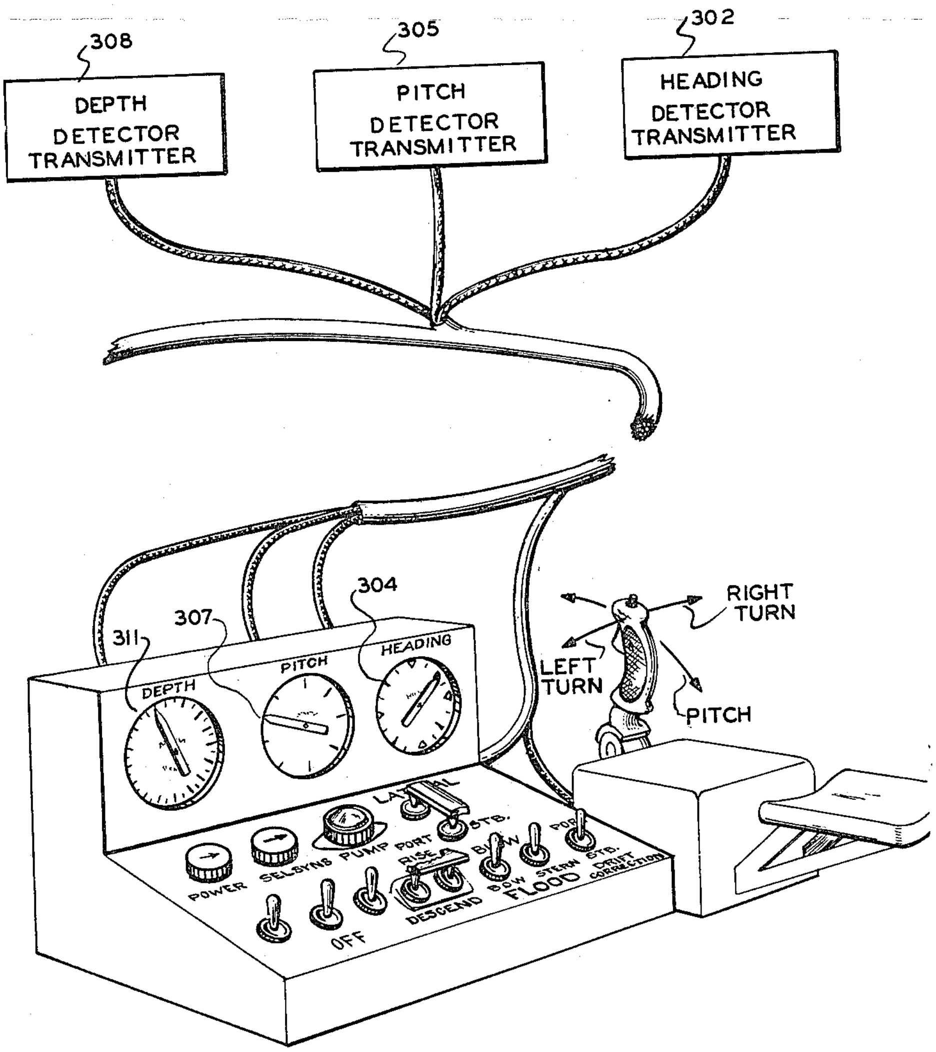
Fig. 7B is a more detailed pictorial view illustrating an exemplary arrangement of the propulsion controls and indicators providing the flexible maneuverability of the present invention.

In order to take full advantage of the maneuverability of the propulsion means disclosed herein it is highly desirable that the operator at the control console be completely apprised of the instantaneous depth attitude (pitch) and heading of housing 11. Referring to Fig. 7B a compass 302 of any conventional design may be placed in housing 11 and its induction transmitted through a synchro transmitter to a synchro receiver and heading indicator 304 located at the control console. Likewise, a pitch detector 305 of any conventional design (a pendulum for example) may be placed in housing 11 and its indication transmitted through a synchro transmitter to a synchro receiver and pitch indicator 307 located at the control console. Moreover, a depth (pressure) detector 308 of any conventional design may be placed in housing 11 and its indication transmitted through a synchro receiver and depth indicator 311 located at the control console. While synchro means has been envisaged herein in order to transmit this important information there are many other known conventional telemetering means which might have been employed. For example, any of the detectors of the depth, attitude or heading of the housing may be placed in respect to the television lens such that their indications via the television link and appear on the perimeter of the television screen shown in Fig. 7A. In addition to those indications, the position of the control console reproduced in Fig. 7B illustrates on-off switches for connecting electrical power to several units such as the synchros and pump.

Figure 8:
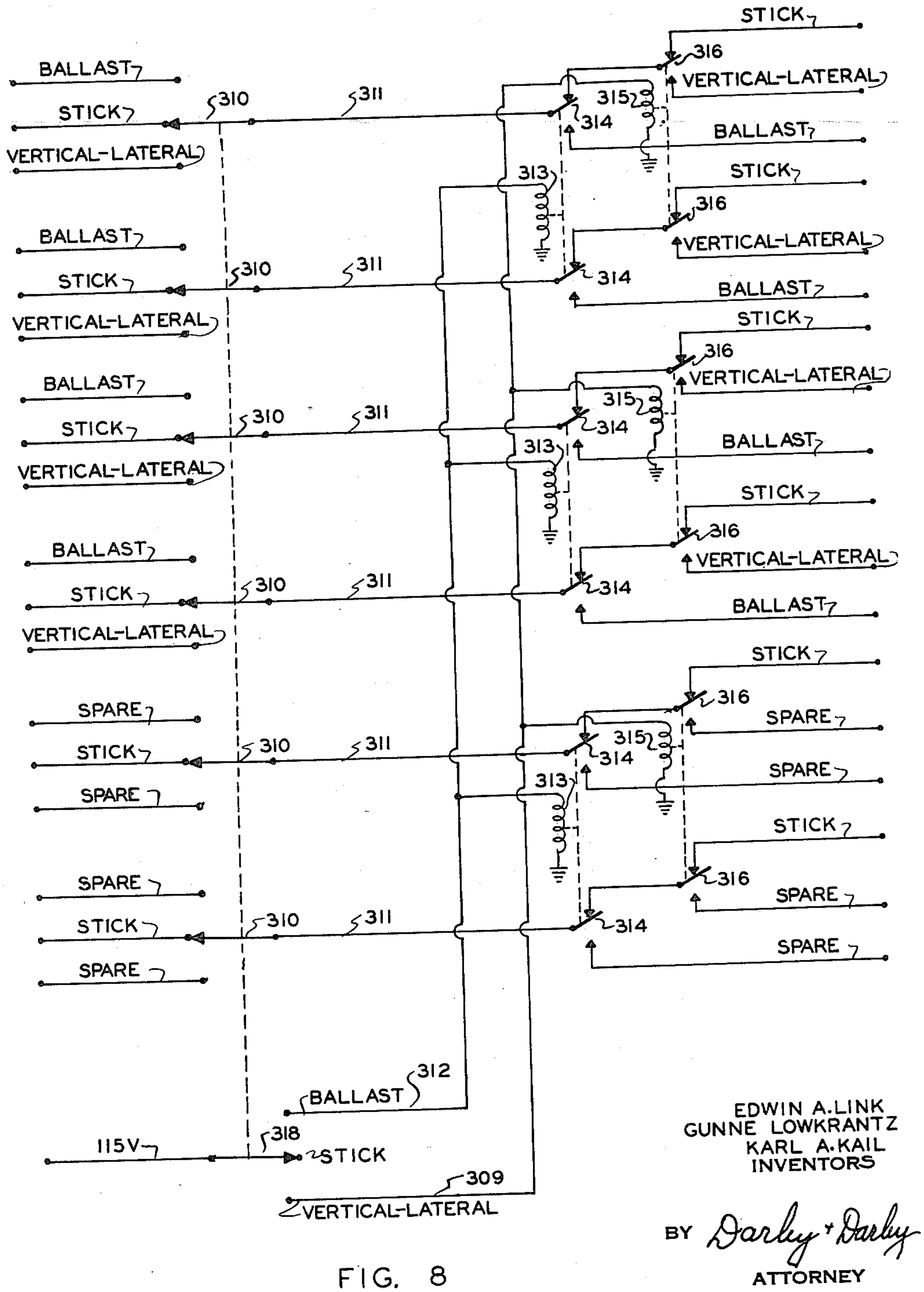
Fig. 8 is an electrical circuit diagram of an exemplary time sharing technique which might be utilized to reduce the number of wires necessary in the remote control cable.

As already suggested above the size of cable 16 is significant in reference to the effect of ocean currents in the housing as it maneuvers about underwater. As is obvious, the length of cable used may vary considerably and the maximum length which may be conveniently used is limited by its weight and cross-section. For these reasons, it is desirable when possible to limit the number of control wires contained in cable 16. Fig. 8 discloses a means which may be adopted toward this end which might be characterized as "time sharing" circuitry. This circuitry is based on the fact that the control exercised in housing 11 may be characterized in three different modes each of which need not be utilized during operation according to either of the others. A first mode of control is the use of the ballast tanks to adjust the attitude, depth and buoyancy of housing. A second mode of control is to use the stick (including trigger and push button) to alter attitude and direction of propulsion of the housing. A third distinct mode of control is to use the ganged switches 132, 133, 134 and 135 (Fig. 4A) to cause the housing to have vertical movement (rise and descend) and the ganged switches 136, 137, 138 and 139 (Fig. 4A) to cause the housing to move laterally (port and starboard). Since these control modes need not be used simultaneously the wires in cable 16 necessary to exercise each of these modes may be time shared with the other two. Fig. 8 is exemplary of a technique only and is not intended to be an indication of the necessary number of wires in cable 16 relating to any of the modes inasmuch as the degree in which time sharing may be embodied is a matter of choice limited by the minimum number of wires necessary for any given mode of operation. Suppose, for example, the most complex mode of control was that resulting from the use of the stick 101 and that a minimum of wires 311 (Fig. 8) contained in cable 16 for this mode is six. Likewise, suppose that for the modes designated as Vertical-Lateral and ballast only four wires 311 are required. Based on these hypothetical requirements there are six groups of control wires (three wires in each group) on the left side of Fig. 8 to be selectively connected to six groups of control wires (three wires in each group) on the right hand side of Fig. 8 through the six wires 311 contained in cable 16. The six groups of wires on the left and mechanically interlocked switches 310 may be located at the control console shown in Figs. 7A and 7B for selection of the desired mode by selector switch 318. While the six groups of wires on the right, with electrically and mechanically interlocked switches 314 and 316 may be located within the housing 11. Also, selector wires 312 and 319 may be located in cable 16. When selector switch 318 is placed in the center or stick position for the stick mode of control, switches 310 in each group connect stick control wires at the control console to a corresponding wire 311 in cable 16. Meanwhile in the housing 11 switches 314 and 316 are mechanically biased to a position such that each connects a wire 311 to a corresponding stick control wire. When selector switch 318 is in the upper or ballast position for the ballast mode of control, switches 310 in each group connect ballast control wires at the control console to a corresponding wire 311 in cable 16. Meanwhile selector switch 318 connects a voltage source located at the control console through wire 312 to energize three relays 313 which are connected parallel and located in housing 11 such that switches 314 are positioned to connect each wire 311 to a ballast control wire or a spare. Two switches 314 are shown as operated by one relay 313 herein. It should be emphasized however, that this is a matter of choice as each switch 314 may be operated by a separate relay or alternatively all of the switches 314 could be ganged and operated by one relay 313 when energized through wire 312. When selector switch 318 is in the lower or vertical-lateral mode of control, switches 310 in each group connect vertical-lateral control wires at the control console to a corresponding wire 311 in cable 16. Meanwhile a selector switch 318 connects a voltage source located at the control console through wire 309 to energize three relays 315 which are connected in parallel and located in housing 11 such that switches 316 are positioned to connect each wire 311 to a vertical-lateral control wire or a spare. (It should be noted that under this selector switch position, switches 314 are biased to their upper selector switch position, switches 314 are biased to their upper position.) As already suggested in connection with relays 313 and switches 314, the selection of the number of switches 316 operated by one relay 315 is a matter of choice and design. Also the particular use of the spare wires available in the ballast and vertical-lateral modes of control is a matter of choice. For example, they may be used for instrumentation connections providing particular utility for these modes of control.

In addition to reducing the size of the cable 16 it often is desirable to construct it in a manner such that it has zero or a small positive buoyancy such that the cable, when not acted on by other forces, will float. This greatly facilitates the remote control of the geographical position, heading and attitude of the housing 11. This may be accomplished by making the cable 16 covering of buoyant material or by adding buoyant floats at intervals along the cable.

A new and improved mobile housing, suitable for immersion in a fluid, having great agility and ease of control and useful for observation and other purposes has been described above. The above description of this invention will undoubtedly suggest to those skilled in the art many modifications and changes in practicing the invention without the exercise of more than ordinary mechanical skill.

It will thus be seen that the objects set forth above, among those made apparent from the preceding description, are efficiently attained, and since certain changes may be made in the above constructions without departing from the scope of the invention it is intended that all matter contained in the above description, or shown in the accompanying drawing shall be interpreted as illustrative and not in a limiting sense.

Various modifications of the controls have also been considered but not mentioned. For example, the solenoid-operated valves have been described as generally spring-biased closed, being opened by the energization of their associated solenoids. If the valves 34 and 87 which control the flow of air (or gas) from the containers 32 to the ballast tanks 29 and 31 and the valves 91 and 95 which allow water to be expelled from the tanks were spring-biased open, and were closed by the energization of their solenoids, then a power failure in the housing 11 would allow these valves to open, blowing the tanks and ensuring that the housing 11 would rise to the surface and be recovered. It should be understood that the present invention is not limited in its application to viewing underwater but could well be useful in performing work underwater by devices which may or may not be attached to the housing.

It is also to be understood that the following claims are intended to cover all of the generic and specific features of the invention herein described, and all statements of the scope of the invention which, as a matter of language, might be said to fall therebetween.

Having described our invention, what we claim as new and desire to secure by Letters Patent is:

1. A submersible housing having a television camera fixedly mounted therein, a reaction type propulsion means comprising plural nozzles spaced about the exterior of said housing with their orifices aimed away from the center of gravity of said housing at angles of substantially 45° with respect to a set of three orthogonal axes originating at the center of gravity of said housing, a plurality of relays for operating said nozzles, a remote control station, a television receiver at said remote control station to receive signals from said television camera, and means to close a control loop between said submersible housing and said control station including a plurality of switches at said remote control station for selectivity operating said relays to control said nozzles in a manner such that the submersible housing and the television camera may be oriented as to either position, depth, heading or attitude without modification of the television camera as to any of the other of said degrees of freedom.

2. A submersible housing, a television camera fixedly mounted therein, a reaction type propulsion means for said housing comprising plural nozzles spaced about the exterior of said housing with their orifices aimed away from the center of gravity of said housing at angles of substantially 45° with respect to a set of three orthogonal axes originating at the center of gravity of said housing, a plurality of relays for operating said nozzles, a remote control station, a television receiver at said remote control station to receive signals from said television camera, and means to close a control loop between said submersible housing and said control station including a plurality of switches at said remote control station for selectively operating said relays to control said nozzles such that the heading of said submersible housing and said television camera may be changed without modifying its geographical position, attitude or depth.

3. A submersible housing, a television camera fixedly mounted therein, a reaction type propulsion means for said housing comprising plural nozzles spaced about the exterior of said housing with their orifices aimed away from the center of gravity of said housing at angles of substantially 45° to the center line of the housing and to a set of three orthogonal axes originating at the center of gravity of said housing, a plurality of relays for operating said nozzles, a remote control station, a television receiver at said remote control station to receive signals from said television camera, and means to close a control loop between said submersible housing and said control station including a plurality of switches at said remote control station for selectively operating said relays to control said nozzles in a manner such that the attitude of the television camera may be changed without modifying its geographical position, heading or depth.

4. A submersible housing, a television camera fixedly mounted therein, a reaction type propulsion means for said housing comprising plural nozzles spaced about the exterior of said housing comprising plural nozzles spaced about the exterior of said housing with their orifices aimed away from the center of gravity of said housing at angles of substantially 45° to the center line of the housing and to a set of three orthogonal axes originating at the center of gravity of said housing, a plurality of relays for operating said nozzles, a remote control station, a television receiver at said remote control station to receive signals from said television camera, and means to close a control loop between said submersible housing and said control station including a plurality of switches at said remote control station for selectively operating said relay to control said nozzles in a manner such that the depth of the television camera may be changed without modifying its geographical position, heading and attitude.

5. A submersible television camera comprising a submersible housing, a television camera fixedly mounted therein, a reaction type propulsion means for said housing comprising plural nozzles spaced about the exterior of said housing with their orifices aimed away from the center of gravity of said housing at angles of substantially 45° to the center line of the housing and to a set of three orthogonal axes originating at the center of gravity of said housing, a plurality of relays for operating said nozzles, a remote control station, a television receiver at said remote control station to receive signals from said television camera, and means to close a control loop between said submersible housing and said control station including a plurality of switches for selectively operating said relays to control said nozzles at said remote control station in a manner such that the television camera may be oriented as to either position, depth, heading, or attitude without modification of the television camera as to any of the other of said degrees of freedom, means located in said housing for detecting depth, heading, and attitude of said housing, and means responsive to said detecting means located at said remote control station for indicating the depth, heading and attitude of said housing.

6. In a submarine vessel, drive means for propelling said vessel in a plurality of directions, said drive means comprising a plurality of nozzles spacedly disposed about the exterior of the vessel, means contained by said vessel for placing a fluid under pressure, means including relays capable of controlling valves for selectively applying said fluid under pressure to individual nozzles whereby each nozzle creates a reactive force tending to propel the vessel, said nozzles being spaced about the exterior of said vessel with their orifices aimed away from the center of gravity of said vessel at angles of substantially 45° to each of a set of three orthogonal axes originating at the center of gravity of said housing, said orientation of said nozzles being such that the reactive force created by each nozzle is in a direction which is at an angle of substantially 45° with respect to each of the orthogonal axes, and means including switches for operating said selective means from a location remote from said vessel to provide a suitable combination of reactive forces to provide a desired resultant force to translate said vessel in any direction of three dimensional space or to rotate it about any one of, or any combination of, the orthogonal axes.

References Cited in the file of this patent

UNITED STATES PATENTS 2,330,674 Briggs ---------------- Sept. 28, 1943
2,433,971 Adams ---------------- Jan. 6, 1948

FOREIGN PATENTS 445,699 Great Britain ----------- Apr. 14, 1936